United States Patent
Pendar et al.

(10) Patent No.: US 12,526,271 B2
(45) Date of Patent: Jan. 13, 2026

(54) NETWORK INTRUSION DETECTION IN A LARGE-SCALE AUTHENICATION SCENARIO

(71) Applicant: SAP America, Inc., Newtown Square, PA (US)

(72) Inventors: Nick Pendar, San Ramon, CA (US); Vahid Bisadi, Danville, CA (US); Sanjeev Chakravarty, Newark, CA (US)

(73) Assignee: SAP America, Inc., Newtown Square, PA (US)

( * ) Notice: Subject to any disclaimer, the term of this patent is extended or adjusted under 35 U.S.C. 154(b) by 361 days.

(21) Appl. No.: 17/988,494

(22) Filed: Nov. 16, 2022

(65) Prior Publication Data

US 2024/0163275 A1 May 16, 2024

(51) Int. Cl.
*H04L 9/40* (2022.01)
(52) U.S. Cl.
CPC ........ *H04L 63/083* (2013.01); *H04L 63/1416* (2013.01)
(58) Field of Classification Search
CPC ............... H04L 63/083; H04L 63/1416; H04L 63/1425
See application file for complete search history.

(56) References Cited

U.S. PATENT DOCUMENTS

| | | | | |
|---|---|---|---|---|
| 7,805,762 B2* | 9/2010 | Rowland | ............. | H04L 63/1433 |
| | | | | 713/153 |
| 9,231,962 B1* | 1/2016 | Yen | ..................... | H04L 63/1425 |
| 10,891,372 B1* | 1/2021 | Shahbazi | ............ | H04L 63/0815 |
| 2011/0173699 A1* | 7/2011 | Figlin | ................. | H04L 63/1441 |
| | | | | 726/23 |
| 2016/0105801 A1* | 4/2016 | Wittenberg | ........... | H04W 4/029 |
| | | | | 455/411 |
| 2017/0032130 A1* | 2/2017 | Joseph Durairaj | ........................ | |
| | | | | H04L 63/1416 |
| 2018/0336353 A1* | 11/2018 | Manadhata | ......... | G06F 16/3334 |
| 2019/0081968 A1* | 3/2019 | Wang | .................... | H04L 63/102 |
| 2019/0132323 A1* | 5/2019 | Williams | .............. | H04L 63/083 |
| 2020/0089848 A1* | 3/2020 | Abdelaziz | ........... | H04L 63/1441 |
| 2020/0302337 A1* | 9/2020 | Jeffery | .................... | G06N 20/00 |
| 2020/0394211 A1 | 12/2020 | Pendar | | |
| 2021/0055973 A1 | 2/2021 | Pendar et al. | | |
| 2021/0092159 A1* | 3/2021 | Crabtree | ............... | G06F 16/951 |
| 2021/0109961 A1 | 4/2021 | Pendar | | |
| 2021/0203651 A1* | 7/2021 | Basson | ................. | G06F 21/556 |
| 2022/0179895 A1 | 6/2022 | Pendar | | |
| 2022/0230189 A1 | 7/2022 | Jeffery et al. | | |

(Continued)

OTHER PUBLICATIONS

"Apache Kafka," *Wikipedia*, en.wikipedia.org, Sep. 29, 2022, 5 pages.

(Continued)

*Primary Examiner* — Kambiz Zand
*Assistant Examiner* — Afaq Ali
(74) *Attorney, Agent, or Firm* — Klarquist Sparkman, LLP

(57) ABSTRACT

Past login activity is used to train a machine learning model and pre-compute network intrusion risk profiles. Subsequent login attempts can be evaluated with the pre-computed network intrusion risk profiles. If the profile shows sufficient intrusion risk, actions can be taken to avoid intrusion, such as requiring further authentication steps.

18 Claims, 9 Drawing Sheets

(56) References Cited

U.S. PATENT DOCUMENTS

2022/0300828 A1 9/2022 Daly et al.
2023/0319052 A1* 10/2023 Aguayo .................. G06N 20/00 726/4

OTHER PUBLICATIONS

Mckeown, "What is Customer Identity and Access Management (CIAM)?" PingIdentity, pingidentity.com, Oct. 21, 2021, 14 pages.

Cheong, "Digital identities and CIAM—a dynamic duo in healthcare," Frontier Enterprise, frontier-enterprise.com, Jun. 26, 2020, 3 pages.

"Intrusion Detection System Using Machine Learning Algorithms," GeeksforGeeks, geeksforgeeks.org, Jan. 14, 2022, 26 pages.

Tait et al., "Intrusion Detection using Machine Learning Techniques: An Experimental Comparison," arXiv:2105.13435 [cs.CR], https://doi.org/10.48550/arXiv.2105.13435, IEEE, May 27, 2021, 10 pages.

Koshy, "Kafka mirroring (MirrorMaker)," ASF Confluence, cwiki.apache.org, Jun. 23, 2017, 3 pages.

"AuditLog," Gigya Documentation, Developers Guide, developers.gigya.com, archived Jul. 20, 2016, 1 page.

"Site Setup," Gigya Documentation, Developers Guide, developers.gigya.com, archived Nov. 5, 2017, 1 page.

"Gradient boosting," *Wikipedia*, en.wikipedia.org, Oct. 21, 2022, 12 pages.

Chepenko, "Introduction to gradient boosting on decision trees with Catboost," towardsdatascience.com, Feb. 13, 2019, 34 pages.

"Firewall Rules FAQ," Cloudflare Docs, developers.cloudflare.com, Oct. 22, 2022, 6 pages.

Said et al., "Data Preprocessing for Distance-Based Unsupervised Intrusion Detection," *2011 Ninth Annual International Conference on Privacy, Security and Trust*, IEEE Xplore, 2011, 8 pages.

* cited by examiner

NETWORK INTRUSION DETECTION IN A LARGE-SCALE AUTHENICATION SCENARIO

FIELD

The field generally relates to computer network security.

BACKGROUND

Detecting network intrusion is a difficult task. Due to the sheer volume of login attempts, it is not possible to expect a manual solution to have much effect. Accordingly, an automated solution can apply heuristics to incoming login attempts and block those that meet a defined rule (e.g., if 80% of logins are unsuccessful, block future attempts).

However, such static solutions catch only a fraction of the intrusion attempts for a variety of reasons. For example, threat actors soon learn the heuristics and adapt their behavior accordingly.

The magnitude of the problem is exacerbated by volume. For example, it is estimated that in some scenarios, about 90% of the network traffic received is attacks.

There therefore remains a need for better solutions to detecting computer network intrusion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises generating a network intrusion risk assessment profile for a login attempt source with a machine learning model trained with events representing past login attempts; storing the network intrusion risk assessment profile as a pre-computed network intrusion risk assessment profile for the login attempt source; receiving a network intrusion risk assessment profile request, wherein the request comprises the login attempt source; responsive to the request, reading the pre-computed network intrusion risk assessment profile for the login attempt source; and responsive to the request, outputting the pre-computed network intrusion risk assessment profile for the login attempt source.

In another embodiment, a computing system comprises a machine learning model stored in one or more non-transitory computer-readable media and trained on time-bounded windows of login events from login attempt sources, wherein the time-bounded windows comprise deemed network intrusion outcome labels; a plurality of stored pre-computed intrusion risk assessment profiles generated from the machine learning model; and an application programming interface configured to receive an intrusion risk profile request for a particular login attempt source, wherein the application programming interface responds to the request with a stored pre-computed intrusion risk assessment profile out of the stored pre-computed intrusion risk assessment profiles generated from the machine learning model for the particular login attempt source.

In another embodiment, one or more non-transitory computer-readable media have stored therein computer-executable instructions that when executed by a computing system, cause the computing system to perform operations comprising receiving logged events representing past login attempts; determining a deemed network intrusion outcome label from the logged events representing the past login attempts with a time-bounded login attempts window; training a machine learning model comprising gradient boosted trees with the deemed network intrusion outcome label and features of the logged events representing the past login attempts; with new incoming events representing new login attempts from a network address and a device identifier, pre-computing a risk assessment profile for the network address and device identifier; storing the pre-computed risk assessment profile for the network address and device identifier; responsive to a request for a risk assessment profile for the network address and device identifier triggered by a login attempt from the network address and device identifier, outputting the pre-computed risk assessment profile for the network address and device identifier; and responsive to determining that a risk score of the pre-computed risk assessment profile for the network address and device identifier exceeds a threshold, escalating authentication requirements for the login attempt.

As described herein, a variety of features and advantages can be incorporated into the technologies as desired.

DETAILED DESCRIPTION

Example 1—Overview

Although there are automated mechanisms in place for detecting network intrusion, they tend to be static in nature and use simple heuristics. Unfortunately, threat actors soon learn the heuristics and adapt their behavior to evade detection.

Another problem relates to the sheer volume of incoming login attempts. For example, during peak shopping season, over a thousand requests can come in per second. Thus, while a machine-learning approach could be used, it has difficulty keeping up with the volume, leading to decreased performance and delayed login times.

Yet another problem relates to different threat characteristics of different websites. For example, a heuristic developed for one website may not perform well in a different environment for another website.

Still further problems relate to the transient nature of attacks. If an IP address is identified as problematic, it can result in disruption of a large portion of users who may share the same IP address.

As described herein, past login activity can be used to train a machine learning model and pre-compute network intrusion risk profiles based on the login attempt source, such as a network address, device identifier, and the like. Subsequently, when a new login attempt comes in from the login attempt source, the pre-computed network intrusion risk profile for the login attempt source can be immediately retrieved and provided for analysis of whether to take an anti-intrusion action.

Such an approach can perform well in a large-scale authentication scenario because pre-computation avoids delay related to waiting for a machine learning model to make a prediction. A large volume of authentication requests can be accommodated.

As described herein, periodic automatic retraining can be performed. Such an approach results in an adaptive intrusion detection solution that can change its behavior based on the changing behavior of threat actors or the bots of intelligent threat actors.

Adaptivity can be accommodated down to the site level, so that the machine learning model is tailored to different websites and provides different results depending on the website.

As described herein, a network intrusion risk score can expire, avoiding long-term disruption to a network address.

The technologies can be useful in any of a variety of authentication scenarios and can be implemented in concert with customer identity and access management (CIAM).

Other benefits are possible as described herein.

The described technologies thus offer considerable improvements over conventional techniques.

Figure 1:
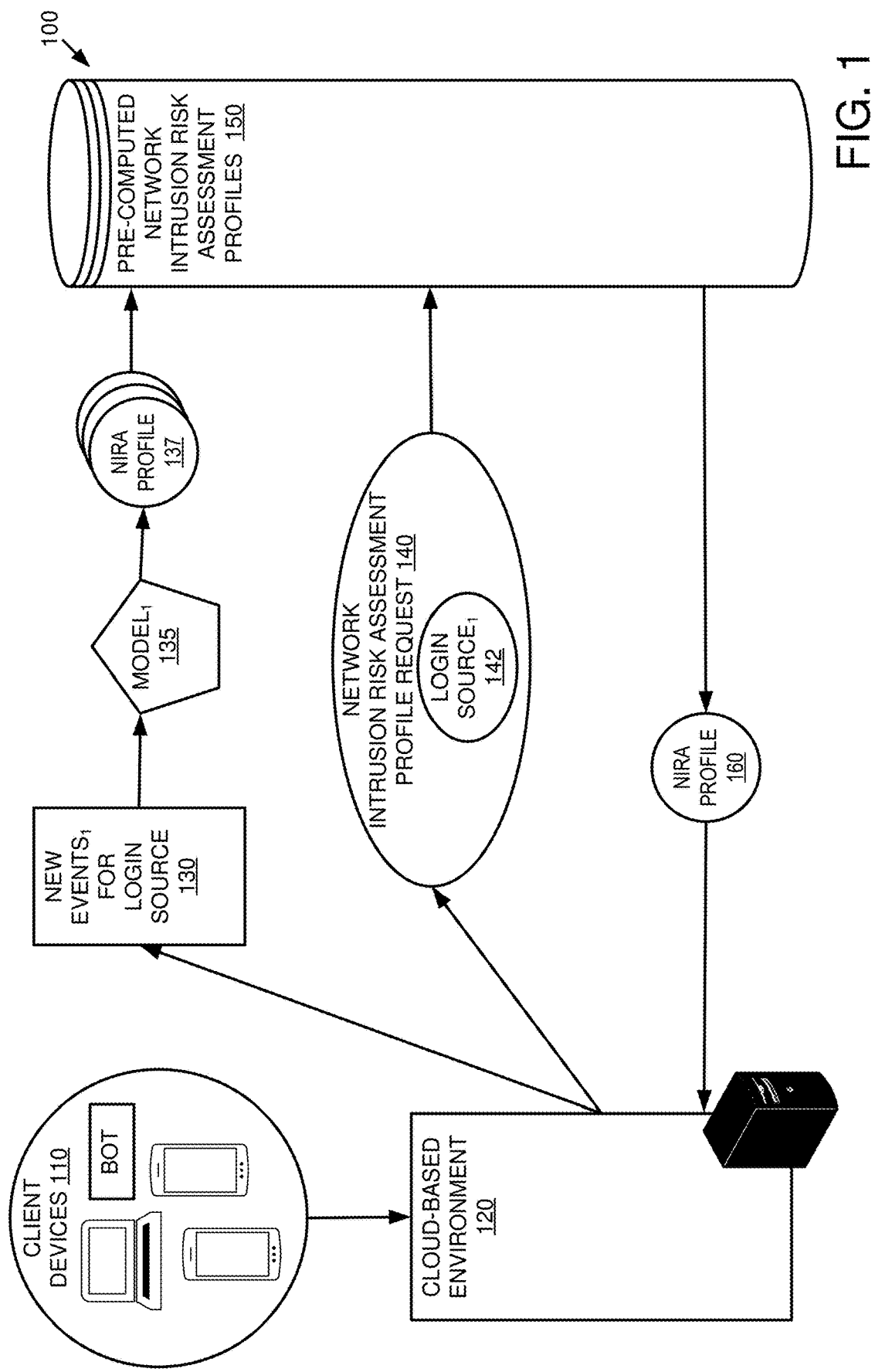
FIG. 1 is a block diagram of an example system implementing network intrusion detection in a large-scale authentication system.

Example 2—Example System Implementing Network Intrusion Detection in a Large-Scale Authentication Scenario FIG. 1 is a block diagram of an example system 100 implementing network intrusion detection in a large-scale authentication scenario. In the example, a cloud-based environment 120 provides services to client devices 110. An authentication service can accept input of credentials (e.g., username and password) as part of login attempts. The login attempts can be logged in log files that include various details about the login attempt, including whether it was successful or not. In practice, events representing login attempts can be generated, published, and subscribed to from a service.

As described herein, a machine learning model 135 can be trained using events representing past login attempts. As described herein, training can be done using time-bounded windows of login events from login attempt sources. The windows can comprise deemed network intrusion outcome labels as described herein.

As new events 130 are logged, the model 135 can be used to pre-compute a network intrusion risk assessment profile 137 for a given combination of a network address and device identifier and store it in pre-computed intrusion risk assessment profiles 150. In practice, a plurality of such profiles are generated (e.g., for various combinations of network addresses and device identifiers). Thus, a database of profiles is built based on past login attempts.

Subsequently, when a network intrusion risk assessment profile request 140 for a specified login attempt source 142 is received (e.g., as part of authenticating an in-progress login attempt), a response with the pre-computed profile 160 for the source 142 can be provided.

In practice, the network intrusion risk assessment profile requests can be handled by an application programming interface powered by a service that has access to the pre-computed network intrusion risk profiles 150. For example, the application programming interface can be configured to receive the request 140 and respond with the pre-computed intrusion risk assessment profile 160 out of the profiles 150.

Further components can be provided. For example, a rule engine can be configured to analyze the pre-computed intrusion risk assessment and, responsive to meeting rule criteria, take an anti-intrusion action. For example, the profile can comprise an intrusion risk score, and the rule criteria can comprise determining whether the score meets a threshold. Anti-intrusion actions can comprise escalating authentication requirements as described herein.

In practice, the systems shown herein, such as system 100, can vary in complexity, with additional functionality, more complex components, and the like. For example, in practice, the number of requests can approach and exceed one thousand per second, based on the volume of logins supported by the cloud-based environment 120. Also, orchestration of the training data can be accomplished through distributed processing across a plurality of nodes. Additional components can be included to implement security, redundancy, load balancing, report design, and the like.

Although some computing systems use a singular form (e.g., client computer, server computer, or the like), in practice, such computing systems can comprise plural computers (e.g., a server farm, data center, or the like).

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, events 130, the model 135, the profiles 137, 160, and the like can be stored (e.g., persisted) in one or more computer-readable storage media or computer-readable storage devices. The technologies described herein can be generic to the specifics of operating systems or hardware and can be applied in any variety of environments to take advantage of the described features.

Figure 2:
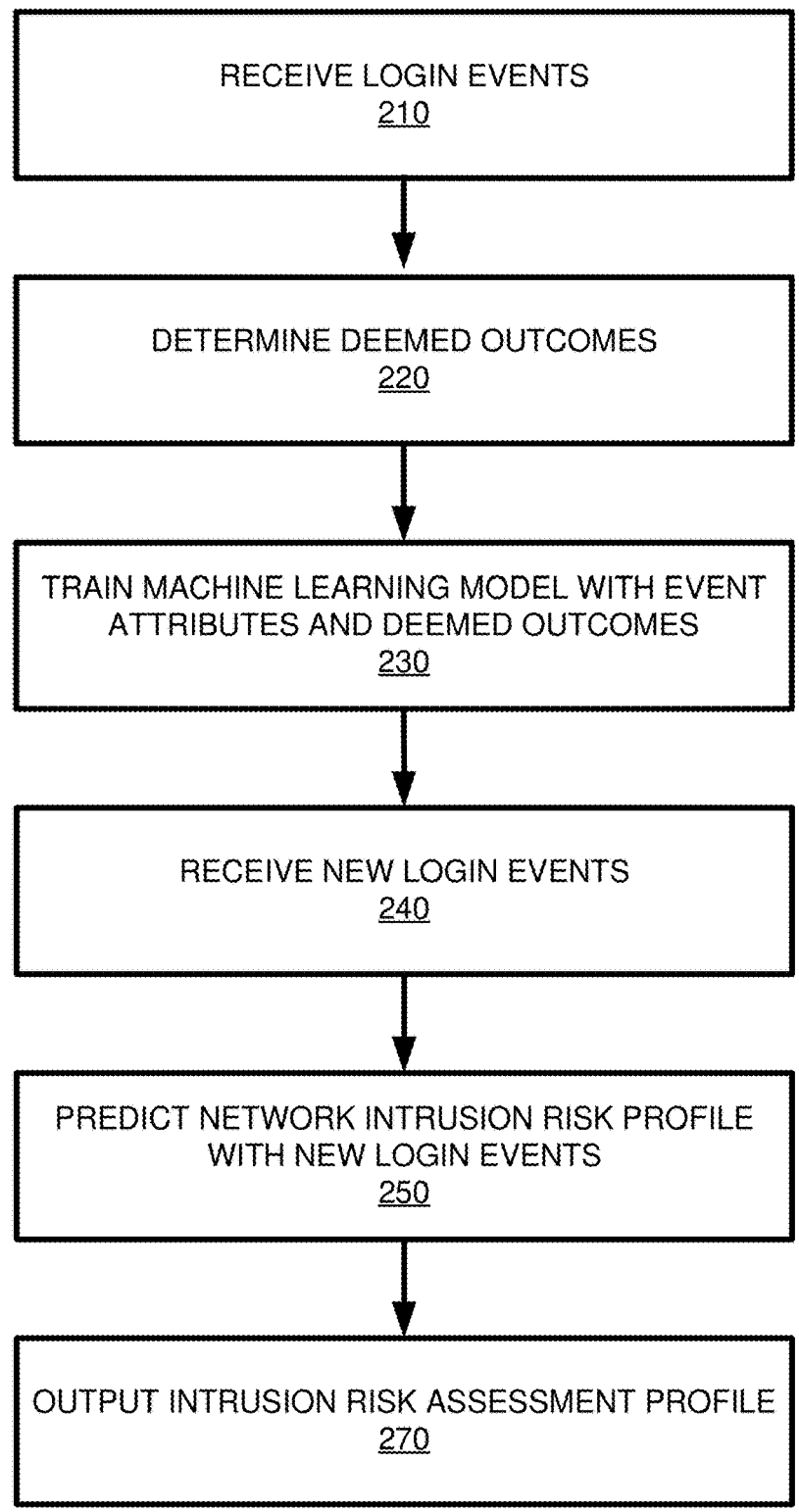
FIG. 2 is a flowchart of an example method of network intrusion detection in a large-scale authentication system.

Example 3—Example Method of Network Intrusion Detection in a Large-Scale Authentication Scenario FIG. 2 is a flowchart of an example method 200 implementing network intrusion detection in a large-scale authentication scenario and can be performed, for example, by the system of FIG. 1. As described herein, the system can support a large number of network addresses and device identifiers. For example, a network intrusion risk assessment profile can be pre-computed for a large number of network address/device identifier combinations.

Although the example describes a situation involving training, the technologies can be useful in scenarios where training has already been performed (e.g., in advance of predicting a network intrusion risk profile with new login events).

At 210, login events are received. As described herein, such events indicate a variety of information about past login attempts, including information such as timestamp, login attempt source, whether the attempt was successful, and any of a variety of other attributes that can be used as features for training as described herein.

At 220, deemed network intrusion outcome labels for the events are determined. As described herein, the labels can be derived from the events representing the past login attempts. A deemed network intrusion outcome label for a given login attempt source can be based on an observed result (e.g., successful login or not) of a most recent login attempt from the source within a time-bounded login attempts window.

At 230, a machine learning model is trained with the event attributes and the deemed outcomes; the model is trained to predict the outcomes (e.g., the likelihood that the next attempt will be unsuccessful). Validation can also be performed to verify that the model is performing above a threshold performance level.

At 240, new login events for new login attempts are received.

At 250, a network intrusion risk profile is predicted (e.g., computed) with the new login events. As described herein, the profile can comprise a network intrusion risk score that indicates a probability that the next login attempt from the login attempt source will be an intrusion attempt (e.g., based on past observations and deemed outcomes).

Then, at 270, the risk profile is output for use in network intrusion detection. As described herein, the profile can be stored as a pre-computed profile for later use.

In practice, 240-250 can be performed repeatedly, and the profiles can be stored as pre-computed profiles as described herein. Requests for a profile will return the most recent pre-computed profile.

Separately, as described herein, 210-230 can be automatically periodically repeated for retraining, for adaptive network intrusion detection.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving a profile can be described as sending a profile depending on perspective.

Example 4—Example High Performance

In any of the examples herein, a database of pre-computed network intrusion risk assessment profiles can support a large-scale authentication scenario. For example, turnaround time from request of network intrusion risk assessment profile to receiving the profile can be reduced considerably because it is already pre-computed instead of computed upon request.

In practice, turnaround time can be very fast (e.g., on the order of under 20 milliseconds, such as a few milliseconds). Thus, a scenario supporting hundreds of login requests per second, or over 1,000 login requests per second can be implemented. High-volume is thus enabled by the technologies described herein.

Such an approach also avoids blocking a network address until the assessment is completed, which can result in blocking others from the same network address. Therefore, the fast turnaround time provides not just a fast response time for the attempt being evaluated, but subsequent attempts from other user credentials.

Example 5—Example Method of Processing Login Requests

Figure 3:
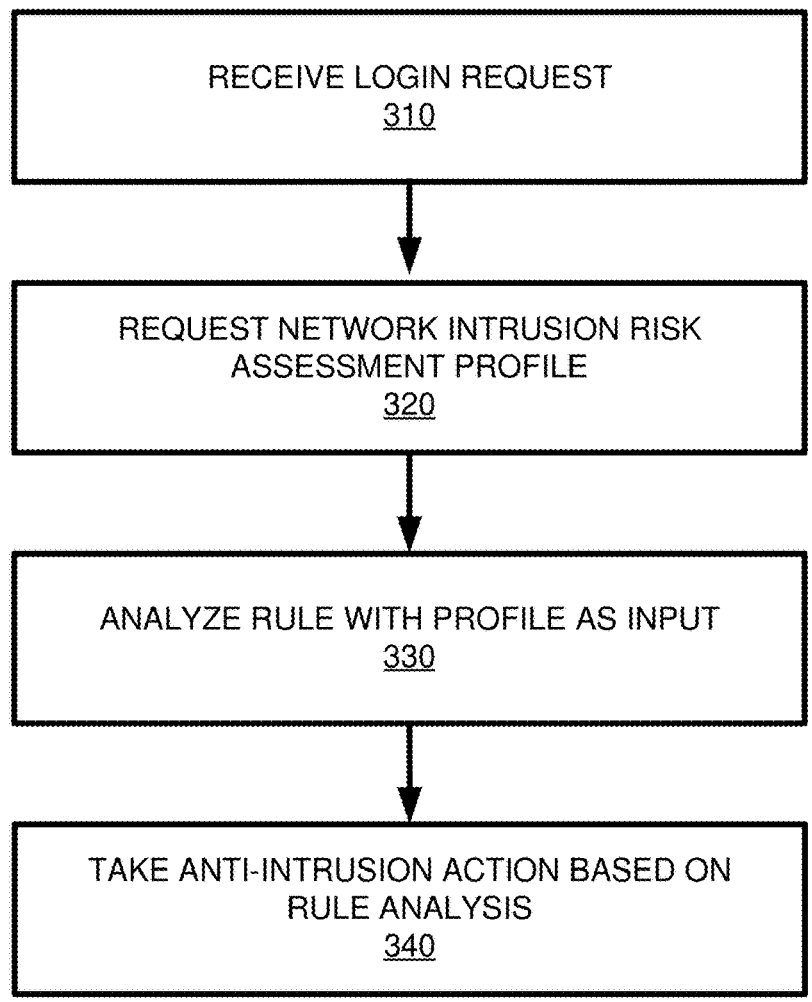
FIG. 3 is a flowchart of an example method of processing login requests with a network intrusion risk assessment profile.

FIG. 3 is a flowchart of an example method 300 of processing login requests with a network intrusion risk assessment profile and can be implemented, for example, by the system of FIG. 1. In practice, the method 300 can be performed subsequent to the method of 200, and the stored pre-computed profiles used for the described profiles.

In the example, at 310, a login request is received. For example, in an authentication system, a username and password or other credentials can be received.

To determine whether the login request is an intrusion attempt, at 320, a network intrusion risk assessment profile can be requested for the login attempt source from which login request originates. The profile is then received.

At 330, a rule is analyzed with the profile as input. For example, a rule can specify criteria, such as checking whether an intrusion risk assessment score exceeds a threshold.

Then, at 340 an anti-intrusion action is taken based on rule analysis. Example anti-intrusion actions are described herein.

Figure 4:
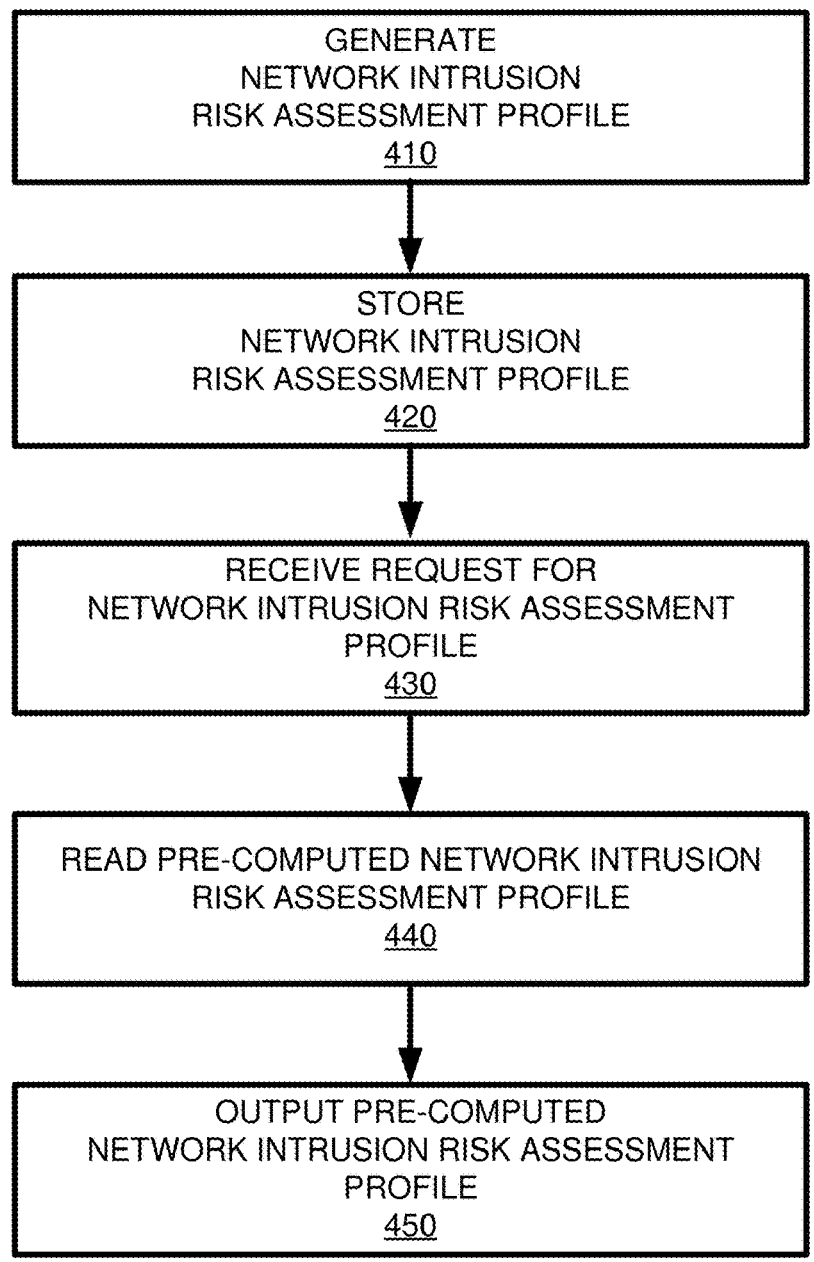
FIG. 4 is a flowchart of an example method of providing pre-computed network intrusion risk assessment profiles.

Example 6—Example Method of Providing Pre-computed Network Intrusion Risk Assessment Profiles FIG. 4 is a flowchart of an example method 400 of providing pre-computed network intrusion risk assessment profiles and can be implemented, for example, by the system of FIG. 1. In practice, the method 400 can be performed as a combination of the technologies described herein in a service provided to authentication services in a large-scale authentication scenario to implement intrusion detection as login attempts come in.

At 410, a network intrusion risk assessment profile is generated for a login attempt source with a machine learning model with events representing past login attempts. For example, the training techniques described in FIG. 2 can be used to generate such a model. In practice, a plurality of such profiles are generated (predicted) by the machine learning model (e.g., for the various login attempt sources observed in the training data).

At 420, the risk assessment profile is stored for later retrieval.

At 430, a request for the network intrusion risk assessment profile of the login attempt source is received. For example, the request can be received from an authentication service that has received a login attempt from the login attempt source that is currently in progress.

At 440, the pre-computed network intrusion risk assessment profile is read. As described herein, the risk assessment profile can be generated from the machine learning model as described in beforehand.

At 450, the pre-computed network intrusion risk assessment profile is output responsive to the request.

As described herein, a network intrusion risk score of the pre-computed network risk assessment profile in a rule, and responsive to determining that criteria of the rule are met, taking an anti-intrusion action for the login attempt source. Example anti-intrusion actions are described herein.

In practice, the method 400 can be performed repeatedly (e.g., for different login attempt sources), providing updated network intrusion risk assessment profiles. Requests will return the most recent profile.

As described herein, the risk score can be expired.

Example 7—Example Login Attempt Source

In any of the examples herein, a login attempt source can indicate from where a login attempt originates (e.g., the origin of the login attempt). In practice, such a source can comprise an identifier, and the identifier can be generated from a combination of other identifiers such as a network address, device identifier, and the like. The network address can represent an IP address or other network node identifier that identifies a node on the network, even if such node is shared by many different devices. The device identifier can be an identifier that represents the particular device (e.g., computer, desktop, laptop, mobile device, wearable, or the like) making the attempt.

Depending on the implementation, the network address may be opaque (e.g., although it represents an IP address, it is encrypted or otherwise obfuscated). Similarly, a device identifier can also be opaque. In fact, the IP address representation itself may vary from site to site (e.g., depending on how the authentication system is implemented).

As described herein, intrusion risk assessment profiles can be pre-computed for the observed permutations of IP address and device identifier. Subsequently, when a request for a particular permutation comes in, the requested pre-computed profile can be provided without the delay associated with computing it.

Example 8—Example Network Intrusion Risk Profile

In any of the examples herein, a network intrusion risk profile can contain information helpful for assessing whether a login attempt is a network intrusion attempt. For example, for a login currently in progress, a pre-computed network intrusion risk profile can be retrieved that indicates a level of risk.

As described herein, the profile can comprise a network intrusion risk score that indicates a probability that a next attempt from the login attempt source is going to fail (e.g., and is thus deemed an intrusion attempt such as an account takeover attack). For example, in practice, high, medium, and low risk ranges of the score can be defined (e.g., 0.80 or higher is considered a high risk or the like; 0.60-0.80 is medium risk, and below that is low risk/threat). Such a score can be output by the machine learning model described herein, which essentially predicts whether a next attempt will be unsuccessful (e.g., the likelihood that the next attempt is unsuccessful and thus deemed to be an intrusion attempt).

As described herein, the profiles can be stored in a database for later use. In practice, the score can then be used to determine whether an anti-intrusion action should be taken. An in-memory database implementation can be used to provide high-performance response to requests, suitable for a large-scale authentication scenario.

In practice, risk profiles may not exist for some login attempt sources. For example, past attempts may not have been made, the profile may have expired, or the like.

Example 9—Example Network Intrusion Risk Profile Expiration

In any of the examples herein, a network intrusion risk profile can be designated as having a time to live (e.g., the profile expires). For example, a set time period (e.g., 1 hour, 2 hours, 4 hours, one day, or the like) can be set, after which, the profile expires.

A request for a profile that has expired can return no score (e.g., indicating no risk). For completeness, a response indicating that a past score has expired can be implemented.

Such an arrangement can be beneficial in that the threat may have passed, and network access is opened up for an associated login attempt source. Such a feature can be beneficial in situations where a login attempt source is shared by multiple users (e.g., an IP address of an institution that has many users). For example, a transient threat attempt in the early morning hours can pass, allowing ordinary users to log in during business hours. Other scenarios are possible.

Such a feature can be implemented in tandem or separately from retraining. Thus a score may be updated, expire, or both.

Example 10—Example Time-bounded Windows of Login Events

In any of the examples herein, time-bounded windows of login events can be used for training. For example, a window (e.g., set) of events within a window of time can be assessed as a group, with the most recent event serving to determine the deemed network intrusion outcome labels for training. The features of the events within the windows can then be used for training as described herein.

Figure 6:
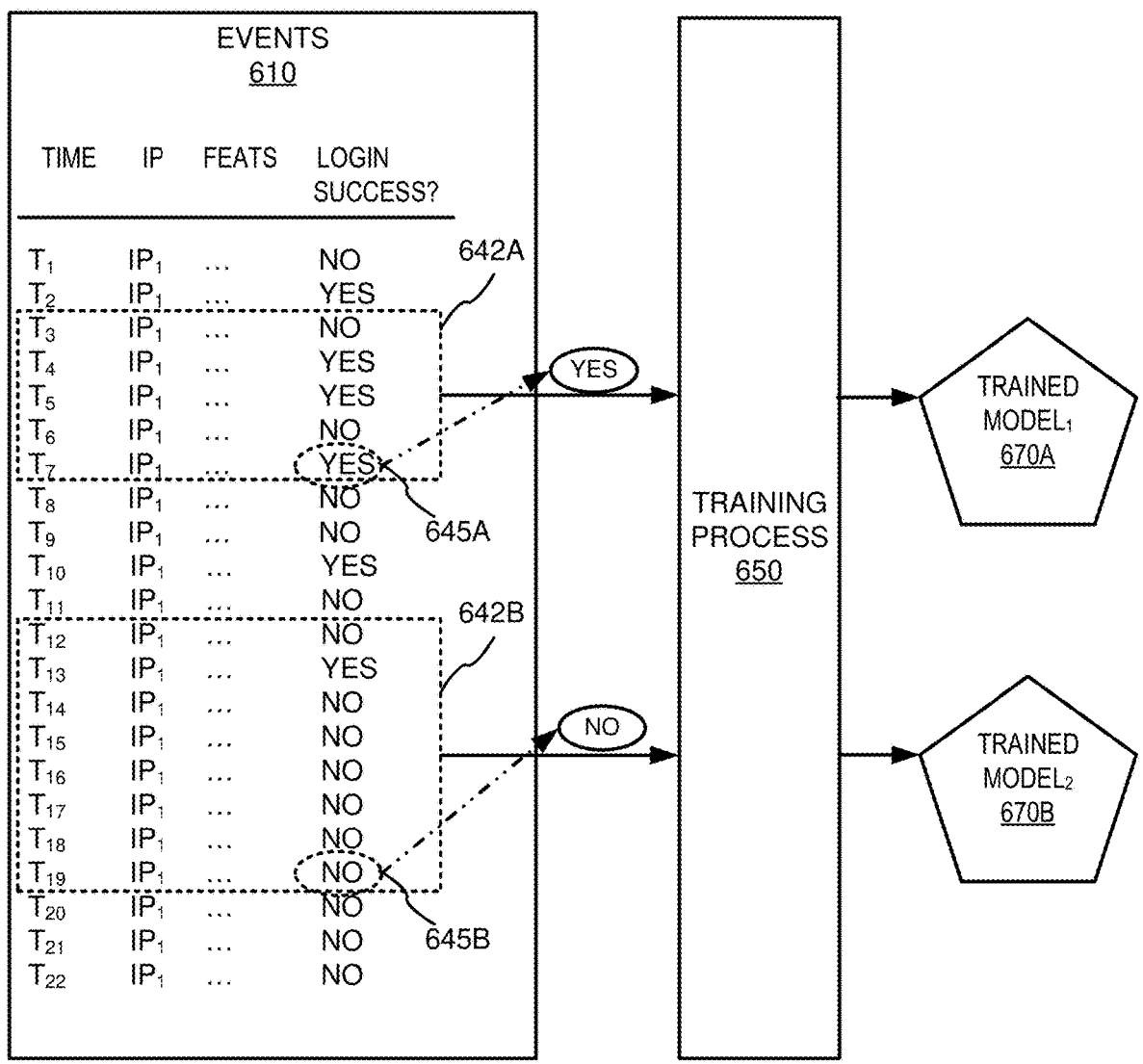
FIG. 6 is a block diagram showing automated recurring retraining of a trained model.

An example of such windows is shown in FIG. 6 as windows 642A, 642B. A typical time frame is five minutes, but any arbitrary length of time is possible (e.g., one minute, two minutes, five minutes, ten minutes, fifteen minutes, or the like).

In practice, a stream of events is being processed. Events are analyzed to determine the distinct login attempt sources over the time window. Then, the events are aggregated by login attempt source (e.g., into a set of events within the window for each login attempt source) and used for training as described herein.

Example 11—Example Login Events

In any of the examples herein, login events can cover activity beyond a bare attempt to login. For example, an implementation covering events for password changes, registration, or the like can be included as login events. In some scenarios, statistical properties of traffic can be used to assign a label.

Example 12—Example Filtering of Deemed-Innocent Login Attempts

In any of the examples herein, failed login attempts under a certain threshold number can be filtered, deemed as not an intrusion attempt, or both. Filtering can be done at training, prediction time, or both. For example, failed login scenarios under a threshold number of failed login attempts can be filtered out during training of the machine learning model, or at prediction time, such scenarios can be indicated as not having high risk.

In practice, a time-bound window with less than a certain threshold number of failed attempts can be omitted from training. Or, in other words, training is limited to those windows (e.g., data sets from windows) having at least a threshold number of failures. A suitable threshold is 5 or 6 failed attempts; however, a stricter threshold or laxer threshold can be appropriate depending on scenario and can be configured to be changeable via a configuration setting.

Such an approach filters out innocent login attempts due to forgotten password, typographical errors, and the like.

Example 13—Example Anti-intrusion Actions

In any of the examples herein, an anti-intrusion action can comprise escalating authentication requirements (e.g., for a login that is currently taking place). Examples of escalating authentication requirements comprise requiring a CAPTCHA before authentication, requiring two-factor authentication, requiring a PIN, requiring a code generated by an authentication application, or the like.

A wide variety of other scenarios are possible. For example, security questions can be asked about personal details of the user logging in, shared secrets can be used, or the like.

Other anti-intrusion actions include blocking the network address (IP address), sending an alert, or the like.

Example 14—Example Rules

In any of the examples herein, rules can be defined with criteria that are evaluated when new login attempts come in. Criteria can include analysis of a risk score for an incoming login attempt. For example, a threshold can be set so that if a risk score exceeds a threshold, additional actions are taken, such as escalating authentication requirements.

In practice, a rule engine can analyze risk profiles and apply the defined rules. A user interface can be provided by which an administrator can flexibly define rules that specify additional authentication requirements when desired.

Example 15—Example Machine Learning Model

In any of the examples herein, a machine learning model can take the form of any of a number of models effective at making future predictions based on past results. Such models include artificial neural networks, decision trees, support-vector machines, Bayesian networks, genetic algorithms, isolation forest, and the like. In one implementation, supervised models with a ground truth for training exhibited superior performance. For example, gradient boosted trees (e.g., via Catboost) performed well, but it is expected that other implementations such as deep neural networks or the like can be used instead.

As described herein, the machine learning model can be trained to generate (e.g., predict) a network intrusion risk score that indicates a probability that a next attempt from the login attempt source is going to fail (e.g., and is thus deemed an intrusion attempt such as an account takeover attack).

Example 16—Example Distributed Computing

In any of the examples herein, distributed computing can be used to increase overall performance. For example, the task of filtering events by time window and network address can be distributed among a plurality of computing nodes that then provide event sets in a form suitable for training. The discrete events are aggregated into a time-bounded window that is used for training, and such aggregation can be done by distributed computing nodes.

Training can be done on a single node, or the training can be accomplished by distributed computing.

The generation of risk profiles can also be distributed among a plurality of nodes.

Thus, in any of the examples herein, a method can comprise distributing construction of training data among a plurality of computing nodes, wherein the construction comprises organizing the events representing past login attempts into sets of events for a given login attempt source and determining a deemed network intrusion outcome label from the events representing the past login attempts for the given login attempt source.

Also, for the machine learning, a supervised learning approach is described, but unsupervised learning can also be done. For example, the same events can be handled in parallel by multiple models, thus identifying different kinds of attacks.

Example 17—Example Training Features

Figure 5:
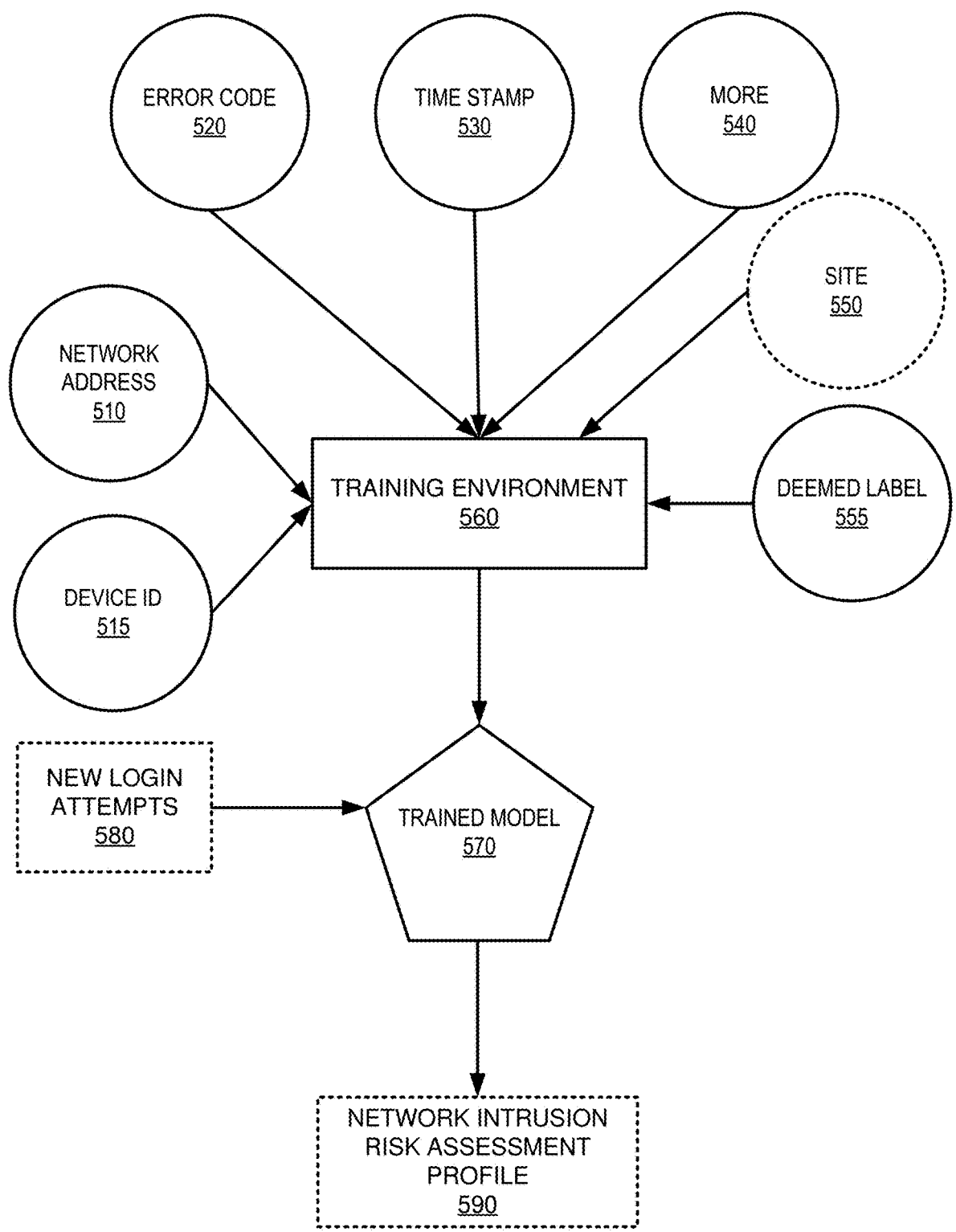
FIG. 5 is a block diagram of example features used during training of a machine learning model that generates network intrusion risk assessment profiles.

FIG. 5 is a block diagram of example features 500 used during training of a machine learning model that generates network intrusion risk assessment profiles that can be used in any of the examples herein. The features are typically drawn from login events that contain various attributes related to the login attempt. For example, a login attempt source can be represented by the network address 510 and the device identifier 515. An error code 520 can indicate whether the login attempt was successful and, if not, why not.

A time stamp 530 can indicate the time at which the login attempt took place. In practice, the time stamp can be transformed into a normalized form (e.g., seconds after first attempt, seconds before final attempt, time difference between the attempts, etc.) based on the events in time-bounded windows as described herein. Thus, any time-based metric of login attempts based on the time stamp 530 can be used.

Other features 540 are possible, including a variety of attributes such as country of login attempt, time to fill out the authentication form (e.g., how long did it take to fill out the form), request headers content type, request headers user agent, SDK version, login parameters, pageURL, agent browser, agent operating system, agent version, and the like. A grid search optimization algorithm can be used to find the best set of hyperparameters for the model.

Derived aggregated features (e.g., cross-event features) such as number of attempts, percentage of login failures, average time to fill out form, average time between the attempts, and the like can also be included in training.

The site being logged into (e.g., site identifier) 550 can also be provided, making the training adaptive (e.g., different based on different sites). The site can be a URL, page name, or code indicating a login destination (e.g., web page, portal, or the like). Such an arrangement allows the technologies to adapt differently to different login destinations, even if for the same enterprise.

As described herein, a deemed network intrusion outcome label 555 determined for the time-bounded window of events can be used for training. The events are organized (e.g., grouped) by login attempt source (e.g., network address and device identifier) into time-bound windows as described herein. As described herein, the deemed label 555 can be based on whether the most recent attempt in the window was successful or not. For example, if the attempt is not successful, it is deemed that the attempt was an intrusion attempt that was blocked. Events within such a window are then submitted during training and labeled as "intrusion attempt." On the other hand, ones with a most recent successful attempt can be labeled as "successful." In practice, 1 and 0 can be used to label 1 as success and 0 as intrusion attempt, vice versa, or the like. The model is thus trained to predict a risk score (e.g., the likelihood that the next attempt from a source is a (deemed) intrusion attempt).

In practice, training can be performed for login-attempt-source-organized time-bound windows for multiple login attempt sources. Multiple windows for the same login attempt source can be used.

Such features are provided to a training environment 560. Thus, previous attempts in the window are used as training for the model 570.

Subsequently, the attributes of the events of new login attempts 580 for a login attempt source can be input to the model 570, which generates a network intrusion risk assessment profile 590 for the login attempt source that includes the risk score. In practice, a plurality of profiles is generated for respective login attempt sources.

Example 18—Example Login Events

In any of the examples herein, the login events can be provided via subscription (e.g., to a service, topic, or the like). As described herein, the events have attributes (e.g., attribute name, attribute value pairs) that can be used for training.

Thus, any of the methods herein can further comprise subscribing to login events from a subscription service, receiving such events as a result of the subscription, and then integrating attributes from the login events as features during training of the machine learning model.

Other approaches are possible. For example, as events are logged, a query to the log can extract events that can be used for training.

Example 19—Example Automated Recurring Retraining

FIG. 6 is a block diagram showing automated recurring retraining 600 of a trained model that can be used in any of the examples herein. The process of retraining can be performed by a retraining service performing the acts described herein.

As new events are being scored in a streaming fashion (e.g., to refresh profiles), they can also be saved to a file system. The new stored events 610 can be aggregated into time-bounded windows 642A for a particular login attempt source. A deemed network intrusion outcome label 645A can be determined for a window 642A, and the features (attributes) of the events within the window 642A can be used for training during the training process 650, generating a trained model 670A using the training techniques described herein. In practice, a large number of windows 642A can be involved, and there can be multiple windows per login attempt source.

The trained model 670A can be validated, and if it passes validation (e.g., meets a threshold precision and recall), it can then be automatically deployed to generate predictions that can then be used as pre-computed profiles as described herein. Any number of metrics can be used to measure performance, such as the F0.5 score, which puts more weight on precision. But, in practice, different metrics can be used for validation.

Subsequently, a second trained model 670B can be trained based on other time-bounded event windows such as 642B, for which deemed network intrusion outcome labels 645B have been determined. Again, if the model 670B passes validation, it can be deployed for use in generating profiles.

Thus, periodic automatic refreshing of the machine learning model can be achieved. The model 670B can go live for use, thus adapting to new behaviors exhibited in the new events. New behaviors can originate from intelligent threat actors, their bots, or the like.

In practice, retraining can be periodically performed on demand or on a regular basis (e.g., every d days or the like).

Any of the methods described herein can comprise periodically automatically refreshing the machine learning model, which comprises, for a set of events representing new login attempts, determining deemed network intrusion outcome labels derived from the set of events representing the new login attempts. The machine learning model can be retrained with the set of events and the deemed network intrusion outcome labels. The retraining produces a retrained machine learning model. The retrained machine learning model can be validated.

Responsive to determining that the retrained machine learning model passes validation, the retrained machine learning model can be automatically deployed to replace the old one. New network intrusion risk profiles can be generated with the retrained machine learning model.

Validation can be based on testing the model against testing data (e.g., from the events 610). Models that exceed a threshold performance can be deemed as passing validation and be deployed.

Example 20—Example Software Architecture

Figure 7:
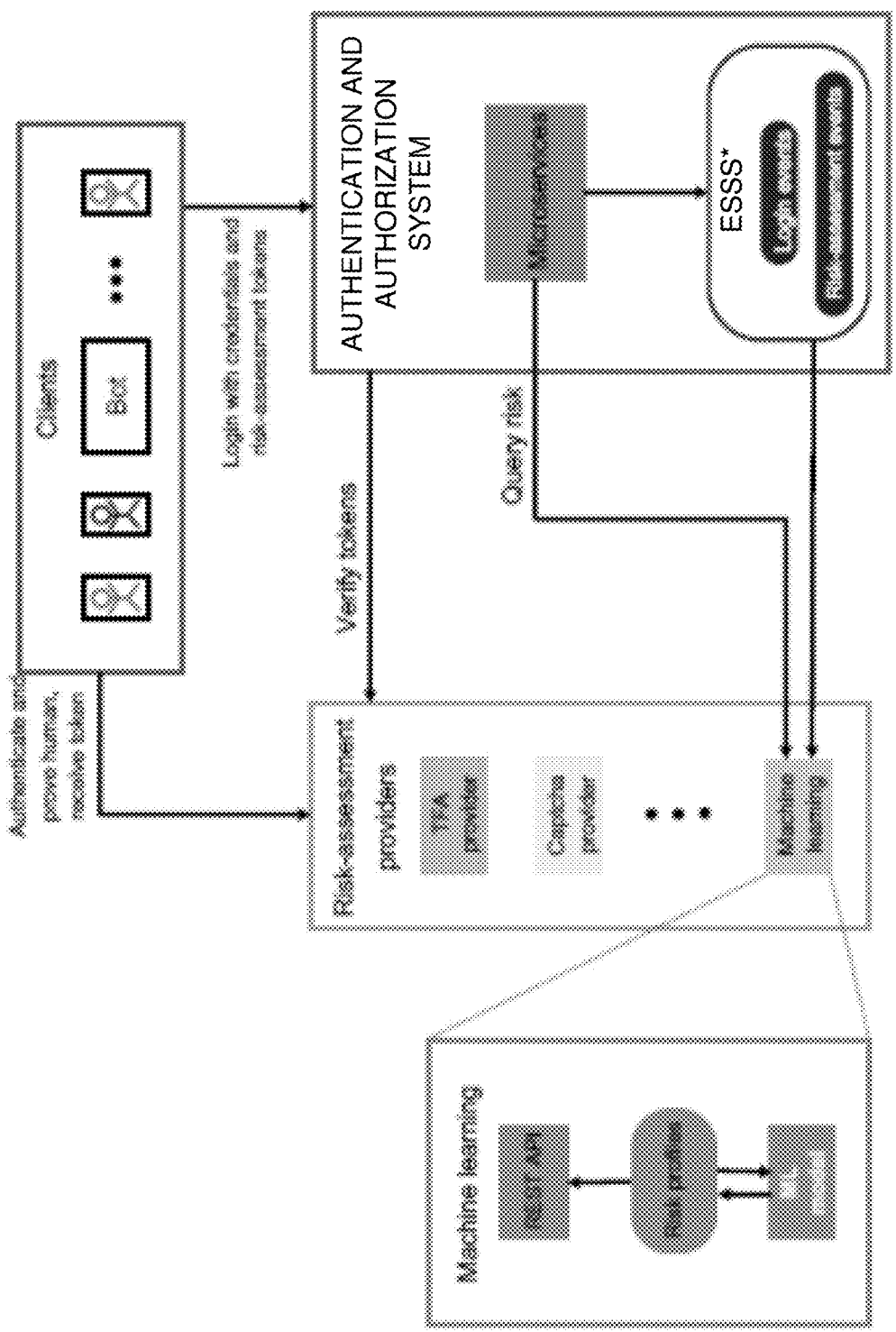
FIG. 7 is a block diagram of an example software architecture implementing network intrusion detection in a large-scale authentication scenario.

FIG. 7 is a is a block diagram of an example software architecture 700 implementing network intrusion detection in a large-scale authentication scenario that can be used to implement the technologies described herein. In the example, a customer data cloud service comprises microservices that assess intrusion risk.

A streaming service (e.g., Apache Kafka) can be used to provide login events and risk-assessment event topics that provide events to subscribers, such as a risk-assessment provider. A machine learning service at a risk-assessment provider can process the events as described herein to generate risk profiles, which are provided to the microservices upon query to a REST API as shown. Other services, such as two-factor authentication (TFA), CAPTCHA, and the like can be provided.

Clients accessing the cloud (e.g., logging in) can provide credentials and tokens (e.g., originating from the risk-assessment provider service) as appropriate during the process as they attempt to login from login attempt sources.

Example 21—Example Implementations

Clause 1. A computer-implemented method comprising:
  generating a network intrusion risk assessment profile for a login attempt source with a machine learning model trained with events representing past login attempts;
  storing the network intrusion risk assessment profile as a pre-computed network intrusion risk assessment profile for the login attempt source;

receiving a network intrusion risk assessment profile request, wherein the request comprises the login attempt source;

responsive to the request, reading the pre-computed network intrusion risk assessment profile for the login attempt source; and responsive to the request, outputting the pre-computed network intrusion risk assessment profile for the login attempt source.

Clause 2. The computer-implemented method of Clause 1 wherein:

the machine learning model is trained with deemed network intrusion outcome labels derived from the events representing the past login attempts.

Clause 3. The computer-implemented method of Clause 2 wherein:

at least one deemed network intrusion outcome label out of the deemed network intrusion outcome labels for a given login attempt source is based on an observed result of a most recent login attempt from the login attempt source within a time-bounded login attempts window.

Clause 4. The computer-implemented method of any one of Clauses 1-3 wherein:

the login attempt source comprises a network address.

Clause 5. The computer-implemented method of any one of Clauses 1-4 further comprising:

evaluating a network intrusion risk score of the pre-computed network intrusion risk assessment profile in a rule; and responsive to determining that criteria of the rule are met, taking an anti-intrusion action for the login attempt source.

Clause 6. The computer-implemented method of Clause 5 wherein:

the anti-intrusion action comprises escalating authentication requirements.

Clause 7. The computer-implemented method of any one of Clauses 1-6 wherein:

the network intrusion risk assessment profile comprises a network intrusion risk score representing a probability of an intrusion attack.

Clause 8. The computer-implemented method of Clause 7 further comprising:

expiring the network intrusion risk score.

Clause 9. The computer-implemented method of any one of Clauses 1-8 further comprising:

distributing construction of training data among a plurality of computing nodes, wherein the construction comprises:

organizing the events representing past login attempts into sets of events for a given login attempt source; and determining a deemed network intrusion outcome label from the events representing the past login attempts for the given login attempt source.

Clause 10. The computer-implemented method of any one of Clauses 1-9 wherein:

features used during training of the machine learning model comprise:

country of login attempt, time-based metric of login attempts; and error code of login attempt.

Clause 11. The computer-implemented method of any one of Clauses 1-10 wherein:

features used during training of the machine learning model comprise:

a login attempt site.

Clause 12. The computer-implemented method of any one of Clauses 1-11 further comprising:

periodically automatically refreshing the machine learning model, wherein periodically automatically refreshing the machine learning model comprises:

for a set of events representing new login attempts, determining deemed network intrusion outcome labels derived from the set of events representing new login attempts;

retraining the machine learning model based with the set of events representing new login attempts and the deemed network intrusion outcome labels, wherein the retraining produces a retrained machine learning model;

validating the retrained machine learning model; and responsive to determining that the retrained machine learning model passes validation, deploying the retrained machine learning model, and generating new network intrusion risk profiles with the retrained machine learning model.

Clause 13. The computer-implemented method of any one of Clauses 1-12 further comprising:

subscribing to login events from a subscription service;

receiving the login events; and integrating attributes from the login events as features during training of the machine learning model.

Clause 14. The computer-implemented method of any one of Clauses 1-13 wherein:

failed login scenarios under a threshold number of failed login attempts are filtered out during training of the machine learning model.

Clause 15. A computing system comprising:

a machine learning model stored in one or more non-transitory computer-readable media and trained on time-bounded windows of login events from login attempt sources, wherein the time-bounded windows comprise deemed network intrusion outcome labels;

a plurality of stored pre-computed intrusion risk assessment profiles generated from the machine learning model; and an application programming interface configured to receive an intrusion risk profile request for a particular login attempt source, wherein the application programming interface responds to the request with a stored pre-computed intrusion risk assessment profile out of the stored pre-computed intrusion risk assessment profiles generated from the machine learning model for the particular login attempt source.

Clause 16. The system of Clause 15 further comprising:

a retraining service configured to periodically automatically refresh the machine learning model.

Clause 17. The system of any one of Clauses 15-16 wherein:

the machine learning model is trained on login destinations indicated in the login events.

Clause 18. The system of any one of Clauses 15-17 further comprising:

a rule engine configured to analyze the stored pre-computed intrusion risk assessment profile and, responsive to meeting rule criteria, take an anti-intrusion action.

Clause 19. The system of Clause 18 wherein:

the stored pre-computed intrusion risk assessment profile comprises an intrusion risk score indicating intrusion risk;

the rule criteria comprise determining whether the score meets a threshold; and the anti-intrusion action comprises escalating authentication requirements.

Clause 20. One or more non-transitory computer-readable media having stored therein computer-executable instructions that when executed by a computing system, cause the computing system to perform operations comprising:
  receiving logged events representing past login attempts;
  determining a deemed network intrusion outcome label from the logged events representing the past login attempts with a time-bounded login attempts window;
  training a machine learning model comprising gradient boosted trees with the deemed network intrusion outcome label and features of the logged events representing the past login attempts;
  with new incoming events representing new login attempts from a network address and a device identifier, pre-computing a risk assessment profile for the network address and device identifier;
  storing the pre-computed risk assessment profile for the network address and device identifier;
  responsive to a request for a risk assessment profile for the network address and device identifier triggered by a login attempt from the network address and device identifier, outputting the pre-computed risk assessment profile for the network address and device identifier; and
  responsive to determining that a risk score of the pre-computed risk assessment profile for the network address and device identifier exceeds a threshold, escalating authentication requirements for the login attempt.

Clause 21. One or more computer-readable media having encoded thereon computer-executable instructions that, when executed by a computing system, cause the computing system to perform the method of any one of Clauses 1-14.

Clause 22. A computing system comprising:
  at least one hardware processor;
  at least one memory coupled to the at least one hardware processor; and
  one or more non-transitory computer-readable media having stored therein computer-executable instructions that, when executed by the computing system, cause the computing system to perform any one of the Clauses 1-14.

Example 22—Example Computing Systems

Figure 8:
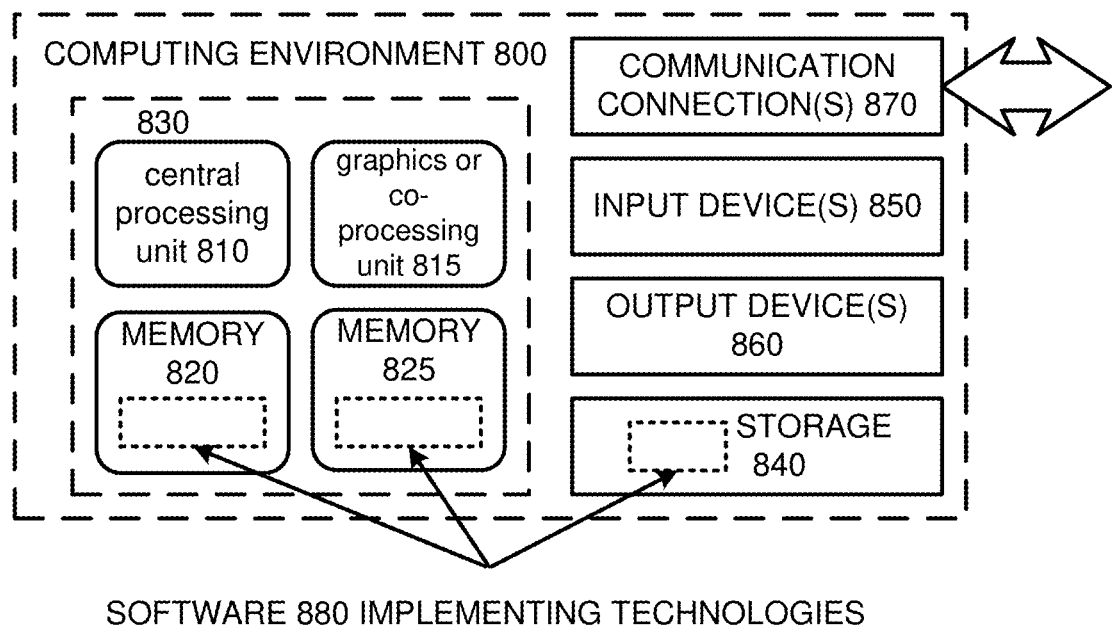
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 can have additional features. For example, the computing system 800 includes storage 840, one or more input devices 850, one or more output devices 860, and one or more communication connections 870, including input devices, output devices, and communication connections for interacting with a user. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 23—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 24—Example Cloud Computing Environment

Figure 9:
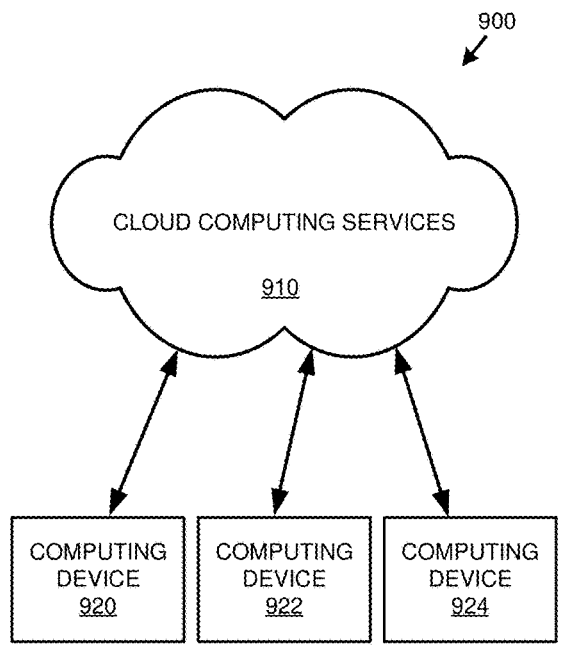
FIG. 9 is a block diagram of an example cloud computing environment that can be used in conjunction with the technologies described herein.

FIG. 9 depicts an example cloud computing environment 900 in which the described technologies can be implemented, including, e.g., the system 100 of FIG. 1 and other systems herein. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 25—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 26—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
generating a network intrusion risk assessment profile for a login attempt source with a machine learning model trained with events representing past login attempts, wherein the network intrusion risk assessment profile comprises a network intrusion risk score representing a probability of an intrusion attack;
storing the network intrusion risk assessment profile as a pre-computed network intrusion risk assessment profile for the login attempt source, wherein the pre-computed network intrusion risk assessment profile is set to expire after a set time period;
receiving a network intrusion risk assessment profile request, wherein the request comprises the login attempt source indicating an origin of a login attempt;
responsive to the request, reading the pre-computed network intrusion risk assessment profile for the login attempt source;
responsive to the request, outputting the pre-computed network intrusion risk assessment profile for the login attempt source; and
expiring the network intrusion risk score after the set time period, wherein a request for an expired network intrusion risk profile returns no network intrusion risk score or a response indicating that a past network intrusion risk score has expired.

2. The computer-implemented method of claim 1 wherein:
the machine learning model is trained with deemed network intrusion outcome labels derived from the events representing the past login attempts.

3. The computer-implemented method of claim 2 wherein:
at least one deemed network intrusion outcome label out of the deemed network intrusion outcome labels for a given login attempt source is based on an observed result of a most recent login attempt from the login attempt source within a time-bounded login attempts window.

4. The computer-implemented method of claim 1 wherein:
the login attempt source comprises an identifier generated from one or more of a network address or a device identifier, and wherein the pre-computed network intrusion risk assessment profile is pre-computed for an observed permutation of the one or more of the network address or the device identifier.

5. The computer-implemented method of claim 1 further comprising:
evaluating the network intrusion risk score of the pre-computed network intrusion risk assessment profile in a rule; and
responsive to determining that criteria of the rule are met, taking an anti-intrusion action for the login attempt source.

6. The computer-implemented method of claim 5 wherein:
the anti-intrusion action comprises escalating authentication requirements.

7. The computer-implemented method of claim 1 further comprising:
distributing construction of training data among a plurality of computing nodes, wherein the construction comprises:
organizing the events representing past login attempts into sets of events for a given login attempt source; and
determining a deemed network intrusion outcome label from the events representing the past login attempts for the given login attempt source.

8. The computer-implemented method of claim 1 wherein:
features used during training of the machine learning model comprise:
country of login attempt,
time-based metric of login attempts; and
error code of login attempt.

9. The computer-implemented method of claim 1 wherein:
features used during training of the machine learning model comprise:
a login attempt site.

10. The computer-implemented method of claim 1 further comprising:
periodically automatically refreshing the machine learning model, wherein periodically automatically refreshing the machine learning model comprises:
for a set of events representing new login attempts, determining deemed network intrusion outcome labels derived from the set of events representing new login attempts;
retraining the machine learning model based with the set of events representing new login attempts and the deemed network intrusion outcome labels, wherein the retraining produces a retrained machine learning model;
validating the retrained machine learning model; and
responsive to determining that the retrained machine learning model passes validation, deploying the retrained machine learning model, and generating new network intrusion risk profiles with the retrained machine learning model.

11. The computer-implemented method of claim 1 further comprising:
subscribing to login events from a subscription service;
receiving the login events; and
integrating attributes from the login events as features during training of the machine learning model.

12. The computer-implemented method of claim 1 wherein:
failed login scenarios under a threshold number of failed login attempts are filtered out during training of the machine learning model.

13. A computing system comprising:
a machine learning model stored in one or more non-transitory computer-readable media and trained on time-bounded windows of login events from login attempt sources, wherein the time-bounded windows comprise deemed network intrusion outcome labels determined for respective sets of login events within respective windows of time, and wherein the respective sets of login events within the respective windows of time are aggregated for the-login attempt sources;
a plurality of stored pre-computed intrusion risk assessment profiles generated from the machine learning model;
and an application programming interface configured to receive an intrusion risk profile request for a particular login attempt source, wherein the application programming interface responds to the request with a stored pre-computed intrusion risk assessment profile out of the stored pre-computed intrusion risk assessment profiles generated from the machine learning model for the particular login attempt source, wherein the network intrusion risk assessment profile comprises a network intrusion risk score representing a probability of an intrusion attack, wherein the network intrusion risk score is configured to expire after a set time period, and wherein the application programming interface is configured to return no network intrusion risk score or a response indicating that a past network intrusion risk score has expired in response to a request for an expired network intrusion risk profile.

14. The computing system of claim 13, wherein the machine learning model is trained on multiple time-bounded windows of login events for a selected login attempt source, and wherein the system further comprises:
a retraining service configured to periodically automatically refresh the machine learning model.

15. The computing system of claim 13 wherein:
the machine learning model is trained on login destinations indicated in the login events.

16. The computing system of claim 13 further comprising:
a rule engine configured to analyze the stored pre-computed intrusion risk assessment profile and, responsive to meeting rule criteria, take an anti-intrusion action.

17. The computing system of claim 16 wherein:
the rule criteria comprise determining whether the network intrusion risk score meets a threshold; and
the anti-intrusion action comprises escalating authentication requirements.

18. One or more non-transitory computer-readable media having stored therein computer-executable instructions that when executed by a computing system, cause the computing system to perform operations comprising:
receiving logged events representing past login attempts;
determining a deemed network intrusion outcome label from the logged events representing the past login attempts with a time-bounded login attempts window;
training a machine learning model comprising gradient boosted trees with the deemed network intrusion outcome label and features of the logged events representing the past login attempts;
with new incoming events representing new login attempts from a network address and a device identifier, pre-computing a risk assessment profile for the network address and device identifier using the machine learning model, wherein the pre-computed risk assessment profile is set to expire after a set time period, and wherein the pre-computed risk assessment profile comprises a network intrusion risk score representing a probability of an intrusion attack;
storing the pre-computed risk assessment profile for the network address and device identifier;
responsive to a request for a risk assessment profile for the network address and device identifier triggered by a login attempt from the network address and device identifier, outputting the pre-computed risk assessment profile for the network address and device identifier;
expiring the network intrusion risk score after the set time period, wherein a request for an expired network intrusion risk profile returns no network intrusion risk score or a response indicating that a past network intrusion risk score has expired; and responsive to determining that a risk score of the pre-computed risk assessment profile for the network address and device identifier exceeds a threshold, escalating authentication requirements for the login attempt.

\* \* \* \* \*